(12) United States Patent
Fine

(10) Patent No.: US 10,947,999 B2
(45) Date of Patent: Mar. 16, 2021

(54) HYDRAULIC-MAGNETIC DRIVEN PISTONS AND METHOD OF USE

(71) Applicant: Stephen Rodney Fine, Henniker, NH (US)

(72) Inventor: Stephen Rodney Fine, Henniker, NH (US)

(\*) Notice: Subject to any disclaimer, the term of this patent is extended or adjusted under 35 U.S.C. 154(b) by 0 days.

(21) Appl. No.: 16/887,848

(22) Filed: May 29, 2020

(65) Prior Publication Data

US 2020/0378413 A1    Dec. 3, 2020

Related U.S. Application Data

(60) Provisional application No. 62/974,800, filed on Dec. 23, 2019, provisional application No. 62/921,045, filed on May 29, 2019.

(51) Int. Cl.
| | | |
|---|---|---|
| *F15B 15/28* | (2006.01) | |
| *F16K 31/08* | (2006.01) | |
| *F02B 63/04* | (2006.01) | |
| *H02K 7/075* | (2006.01) | |

(52) U.S. Cl.
CPC ........ *F15B 15/2861* (2013.01); *F16K 31/082* (2013.01); *B60G 2600/26* (2013.01); *F02B 63/04* (2013.01); *H02K 7/075* (2013.01)

(58) Field of Classification Search
CPC ... F15B 15/2861; F16K 31/082; H02K 7/075; F02B 63/04; B60G 2600/26
See application file for complete search history.

(56) References Cited

U.S. PATENT DOCUMENTS

| | | | | |
|---|---|---|---|---|
| 2,186,676 | A | * | 1/1940 | Hull ...................... G01P 15/00 73/128 |
| 3,664,129 | A | * | 5/1972 | Schwab .................. F01P 7/044 60/451 |
| 4,105,938 | A | * | 8/1978 | Mathews, Jr. ......... G01D 5/246 180/324 |
| 5,146,879 | A | * | 9/1992 | Kume ..................... F01M 1/06 123/48 B |
| 5,203,172 | A | | 4/1993 | Simpson et al. |
| 2010/0258002 | A1 | * | 10/2010 | Elmaleh .................. F04B 17/03 91/55 |
| 2017/0002789 | A1 | | 1/2017 | Nair et al. |
| 2017/0253101 | A1 | | 9/2017 | Kuriki |
| 2018/0216504 | A1 | | 8/2018 | De Mar |

FOREIGN PATENT DOCUMENTS

| | | | |
|---|---|---|---|
| JP | 2013050102 | 6/2012 | |
| KR | 20100087537 | 1/2009 | |
| WO | WO-2009035229 A2 * | 3/2009 | ............... H02K 7/00 |

\* cited by examiner

*Primary Examiner* — Jacob M Amick
*Assistant Examiner* — Charles Brauch
(74) *Attorney, Agent, or Firm* — Hayes Soloway PC

(57) ABSTRACT

A hydraulic-magnetic engine includes a two-stage piston having a middle section and a piston plunger, and a chamber with two separate chambers, a piston chamber and a piston plunger chamber containing fluid throughout. The cross-sectional area of the middle section is greater than the cross-sectional area of the piston plunger. The piston is magnetically propelled up and down and in the process fluid is transferred and exchanged between the two chambers and a hydraulic compensator. The reciprocal motion of the piston is activated and sustained by alternating magnetic attraction and repulsion between the piston and the chamber, while the engine power output is amplified by the hydraulic activity.

25 Claims, 14 Drawing Sheets

300

```
┌─────────────────────────────────────────────────────────────────────┐
│ A piston position sensor 195 senses a position of the piston 130.   │
│                            Step 310                                  │
└─────────────────────────────────────────────────────────────────────┘
                                  ↓
┌─────────────────────────────────────────────────────────────────────┐
│ The piston position sensor 195 sends a signal to the locking        │
│ mechanism 185 and the electromagnet 150.                            │
│                            Step 320                                  │
└─────────────────────────────────────────────────────────────────────┘
                                  ↓
┌─────────────────────────────────────────────────────────────────────┐
│ The locking mechanism 185 unlocks the compensator piston 175.       │
│                            Step 330                                  │
└─────────────────────────────────────────────────────────────────────┘
                                  ↓
┌─────────────────────────────────────────────────────────────────────┐
│ An electrical current is varied to the at least one electromagnet   │
│ 150, the electromagnetic field drawing the at least one permanent   │
│ magnet 155 towards the at least one electromagnet 150.              │
│                            Step 340                                  │
└─────────────────────────────────────────────────────────────────────┘
                                  ↓
┌─────────────────────────────────────────────────────────────────────┐
│ The piston 130 is moving from the first position to the second      │
│ position and the fluid 170 is moved from the distal chamber 125 to  │
│ the compensator reservoir 190 and the plunger chamber 115.          │
│                            Step 350                                  │
└─────────────────────────────────────────────────────────────────────┘
                                  ↓
┌─────────────────────────────────────────────────────────────────────┐
│ The piston position sensor 195 determines the piston 130 is in the  │
│ second position and sends a signal to reverse a current to the at   │
│ least one electromagnet 150, generating a repulsive force between   │
│ the at least one electromagnet 150 and the at least one permanent   │
│ magnet 155 moving the piston 130 toward the first position.         │
│                            Step 360                                  │
└─────────────────────────────────────────────────────────────────────┘
                                  ↓
┌─────────────────────────────────────────────────────────────────────┐
│ The piston position sensor 195 also sends a signal to the locking   │
│ mechanism 185 to lock the compensator piston 175.                   │
│                            Step 370                                  │
└─────────────────────────────────────────────────────────────────────┘
```

| A piston position sensor 195 senses a position of the piston 130.
Step 410 |

↓

| The piston position sensor 195 sends a signal to the control valve 205 and to the at least one electromagnet 150.
Step 420 |

↓

| The control valve 205 is manipulated to receive fluid 170 in the compensator reservoir 190.
Step 430 |

↓

| A current is varied to the at least one electromagnet 150, the electromagnetic fields drawing the at least one permanent magnet 155 towards the at least one electromagnet 150, respectively.
Step 440 |

↓

| The piston 130 is moving from the first position to the second position and the fluid 170 is moved from the distal chamber 125 to the compensator reservoir 190 and the plunger chamber 115.
Step 450 |

↓

| The piston position sensor 195 determines the piston 130 is in the second position and sends a signal to reverse a current to the at least one electromagnet 150, generating a repulsive force between the at least one electromagnet 150, and the at least one permanent magnet 155 moving the piston 130 toward the first position.
Step 460 |

↓

| The piston position sensor 195 also sends a signal to the control valve 205 to permit fluid to exit the compensator reservoir 190.
Step 470 |

A piston position sensor 195 senses a position of the piston 130.
Step 510

The piston position sensor 195 sends a signal to the locking mechanism 185 and to the electromagnets 150a, 150b, 150c.
Step 520

The locking mechanism 185 unlocks the compensator piston 175.
Step 530

A current is varied to the electromagnets 150a, 150b, 150c, the electromagnetic fields drawing the permanent magnets 155a, 155b, towards the electromagnets 150a, 150b, while repulsing the third permanent magnet 155c from the third electromagnet 150c.
Step 540

The piston 130 is moving from the first position to the second position and the fluid 170 is moved from the distal chamber 125 to the compensator reservoir 190 and the plunger chamber 115.
Step 550

The piston position sensor 195 determines the piston 130 is in the second position and sends a signal to reverse a current to the electromagnets 150a, 150b, 150c, generating a repulsive force between the electromagnets 150a, 150b, and the permanent magnets 155a, 155b, and an attractive force between third permanent magnet 155c and the third electromagnet 150c, moving the piston 130 toward the first position.
Step 560

The piston position sensor 195 also sends a signal to the locking mechanism 185 to lock the compensator piston 175.
Step 570

A piston position sensor 195 senses a position of the piston 130.
Step 610

↓

The piston position sensor 195 sends a signal to the locking mechanism 185 and to the electromagnets 150a, 150b, 150c, 150d, 150e.
Step 620

↓

The locking mechanism 185 unlocks the hydraulic compensator 160.
Step 630

↓

A current is varied to the electromagnets 150a, 150b, 150c, 150d, 150e, drawing the permanent magnets 155a, 155b, towards the electromagnets 150a, 150b, while repulsing the permanent magnets 155c, 155d, 155e from the electromagnet 150c, 150d, 150e.
Step 640

↓

The piston 130 is moving from the first position to the second position and the fluid 170 is moved from the distal chamber 125 to the compensator reservoir 190 and the plunger chamber 115.
Step 650

↓

The piston position sensor 195 determines the piston 130 is in the second position and sends a signal to reverse a current to the electromagnets 150a, 150b, 150c, 150d, 150e, generating a repulsive force between the electromagnets 150a, 150b, and the permanent magnets 155a, 155b, and an attractive force between the permanent magnets 155c, 155d, 155e and the electromagnets 150c, 150d, 150e moving the piston 130 toward the first position.
Step 660

↓

The piston position sensor 195 also sends a signal to the locking mechanism 185 to lock the compensator piston 175.
Step 670

```
┌─────────────────────────────────────────────────────────────────────────┐
│ A piston position sensor 195 senses a position of the crankshaft 502.   │
│                              Step 710                                   │
└─────────────────────────────────────────────────────────────────────────┘
                                    ↓
┌─────────────────────────────────────────────────────────────────────────┐
│ The piston position sensor 195 sends signals to the locking mechanisms  │
│ 185, 185' and the electromagnets 150a, 150b, 150c, 150a', 150b', 150c'. │
│                              Step 720                                   │
└─────────────────────────────────────────────────────────────────────────┘
                                    ↓
┌─────────────────────────────────────────────────────────────────────────┐
│ The locking mechanisms 185, 185' lock the first hydraulic compensator   │
│ 160 and unlocks the second hydraulic compensator 160'.                  │
│                              Step 730                                   │
└─────────────────────────────────────────────────────────────────────────┘
                                    ↓
┌─────────────────────────────────────────────────────────────────────────┐
│ A current is varied to the electromagnets 150a, 150b, 150c, 150a',      │
│ 150b', 150c', drawing the permanent magnets 155c, 155a', 155b' toward   │
│ the electromagnets 150c, 150a', 150b' while repulsing the permanent     │
│ magnets 155a, 155b, 155c' from the electromagnets 150a, 150b, and 150c'.│
│                              Step 740                                   │
└─────────────────────────────────────────────────────────────────────────┘
                                    ↓
┌─────────────────────────────────────────────────────────────────────────┐
│ The first piston 130 is moving from the second position to the first    │
│ position and the fluid 170 is moving from the compensator reservoir 190 │
│ and the plunger chamber 115 to the distal chamber 125.                  │
│                              Step 750                                   │
└─────────────────────────────────────────────────────────────────────────┘
                                    ↓
┌─────────────────────────────────────────────────────────────────────────┐
│ The second piston 130' is moving from the first position to the second  │
│ position and the fluid 170' is moving from the distal chamber 125' to   │
│ the compensator reservoir 190 and the plunger chamber 115'.             │
│                              Step 760                                   │
└─────────────────────────────────────────────────────────────────────────┘
                                    ↓
┌─────────────────────────────────────────────────────────────────────────┐
│ Once the piston position sensor 195 determines the first piston 130 is  │
│ in the first position and the second piston 130' is in the second       │
│ position, the piston position sensor 195 sends a signal to reverse the  │
│ state of the locking mechanisms 185, 185' and the polarity of the       │
│ electromagnets 150a, 150b, 150c, 150a', 150b', 150c'                    │
│                              Step 570                                   │
└─────────────────────────────────────────────────────────────────────────┘
```

FIG. 10

HYDRAULIC-MAGNETIC DRIVEN PISTONS AND METHOD OF USE

PRIORITY CLAIM

The present application claims priority to U.S. Provisional Application Ser. No. 62/974,800, filed Dec. 23, 2019, and U.S. Provisional Application Ser. No. 62/921,045, filed on May 29, 2019, the contents of which are each incorporated by reference herein.

FIELD OF THE INVENTION

The present application generally relates to a hydraulic-magnetic driven piston, and more specifically, to a magnetically driven piston which transfers fluid between volumetrically unequal chambers, amplifying energy output.

BACKGROUND OF THE INVENTION

Fossil fuels and the like have been used to power engines, since their inception. However, while operating between a 20%-60% efficiency and the large carbon footprint attributed to their byproducts, a new engine is needed to increase efficiency and decrease or eliminate the harmful byproduct.

A piston is a component of reciprocating engines and various other mechanisms. In a combustion engine, the piston transfers force from the expanding gas in the cylinder to the crankshaft. To get away from fossil fuels, while maintaining significant existing elements of present engine designs, it is desirable to find a way to drive a piston without fossil fuels.

SUMMARY

A hydraulic-magnetic engine wherein the hydraulic-magnetic engine includes a dual chamber having a piston chamber and a piston plunger chamber. The piston chamber includes two sections, a proximal chamber, and a distal chamber. Within the dual chamber is a piston, slidably engaged, and partially within the dual chamber. The piston comprises a piston rod, a middle section and a piston plunger, wherein the piston rod protrudes from the piston chamber.

The dual chamber includes at least one electromagnet fixed to the dual chamber, wherein at least one electromagnet is in electrical communication with an electrical device. Additionally, there is a permanent magnet fixed to the piston, wherein the permanent magnet is within the electromagnetic field of the electromagnet.

A hydraulic compensator is in fluid communication with the piston chamber and the plunger chamber via a hydraulic line. The hydraulic line may be attached to the sides of the dual chamber, at the top of the piston chamber or at the bottom of the plunger chamber respectively. Further, there is a fluid contained within the dual chamber, which flows freely with movement of the piston. In some embodiments the chamber, piston, and hydraulic compensator are made of a nonferrous material.

In a further embodiment, a piston position sensor is in electrical communication with the at least one electromagnet, such that the piston position sensor sends a signal to reverse the current to the electromagnet, thereby reversing the polarity of the at least one electromagnet.

In a further embodiment, a control valve is connected with the hydraulic line, separating the hydraulic line and a hydraulic compensator. In some embodiments the control valve is a solenoid actuated bi-directional control valve, however, any appropriate control valve may be used. The control valve is located so as not to interfere with the magnetic field of the magnets.

In another embodiment, the hydraulic compensator comprises a compensator piston, wherein the compensator piston comprises a locking mechanism in electrical communication with the piston position sensor. In some embodiments the locking mechanism is a solenoid activated switch which locks or unlocks movement of the compensator piston to respectively prevent or permit volume expansion of the compensator reservoir. The locking mechanism is located so as not to interfere with the magnetic field of the magnets.

The hydraulic compensator piston has a biasing device, which can be comprised of a weight, spring, gas filled bladder, or any other suitable mechanism for imposing a force to the hydraulic compensator piston's movement to contract the volume of the compensator reservoir as the fluid from the compensator reservoir is evacuated. The hydraulic compensator piston's resistance to expansion of the compensator reservoir resulting from this biasing is relatively low to avoid unnecessary fluid pressure resistance to replenishing the compensator's reservoir by the time the engine has reached the second position.

In another embodiment the distal chamber comprises a distal volume, the plunger chamber comprises a plunger chamber volume, and the hydraulic compensator has a reservoir volume, wherein the distal volume is slightly less than the combination of the plunger chamber volume, hydraulic line volume, and the compensator reservoir volume, thereby permitting evacuation from the compensator reservoir of whatever amount of fluid is required by the distal chamber at the first position, in the event of any fluid loss in the system.

The hydraulic-magnetic engine has two extreme positions. In a first position, the piston plunger is mostly contained within the plunger chamber and the piston middle portion is within the proximal chamber. In this position, the fluid is mostly contained within the distal chamber, the compensator reservoir, and the hydraulic line. At this position, the hydraulic compensator piston is at least nearly completely descended so there is little or no fluid within the compensator reservoir. In a second position, the piston middle section is located mostly within the distal chamber and the piston plunger is mostly within the proximal chamber. In the second position the fluid is mostly located within the plunger chamber, the hydraulic line, and within the compensator reservoir, thereby substantially filling the compensator reservoir volume.

In a further embodiment, there are multiple electromagnets and multiple permanent magnets, wherein each respective electromagnet and permanent magnet form a magnet set. The electromagnets are fixed on or within the chamber, while the permanent magnets are fixed to the piston. In one embodiment there is one plunger magnet set wherein at least one electromagnet is fixed on or to the plunger chamber, and at least one permanent magnet is fixed to the piston plunger wherein the permanent plunger magnet is within the electromagnetic field of the plunger chamber electromagnet. Additionally or alternatively there may be one or more piston chamber magnet sets, wherein one or more electromagnets are fixed to or within the piston chamber, and one or more piston permanent magnets are fixed to or within the middle section of the piston, wherein the one or more permanent piston magnets are within the electromagnetic field of the one or more electromagnets.

In an embodiment of a method of using the hydraulic-magnetic engine, the hydraulic-magnetic engine is moved into the first position. When the hydraulic-magnetic engine is in the first position, the piston plunger is mostly contained within the plunger chamber and the fluid is substantially contained within the distal chamber, the hydraulic line and the hydraulic compensator reservoir. At this position, movement of the hydraulic compensator piston in the direction of expanding the volume of the compensator reservoir is locked, or the hydraulic compensator's valve configuration permits evacuation of fluid and the compensator piston has substantially descended, such that there is little or no fluid within the hydraulic compensator's reservoir. When the hydraulic-magnetic engine is moved from the first position to the second position, the upward movement of the hydraulic compensator piston is unlocked or the hydraulic compensator valve configuration permits entry of fluid, such that the fluid is substantially contained within the compensator reservoir, the hydraulic line, and the plunger chamber.

In a further embodiment, to move the hydraulic-magnetic engine from the first position to the second position or vice versa, the piston position sensor determines when the piston reaches either position and sends a signal to reverse the current to the at least one electromagnet, so as to reverse the polarity of the at least one electromagnet.

In a further embodiment the piston position sensor sends a signal to the control valve or the hydraulic piston locking mechanism of the hydraulic compensator to either allow fluid to flow into and replenish the compensator reservoir or flow out of the reservoir.

BRIEF DESCRIPTION OF THE DRAWINGS

FIG. 6 is an illustration of a method of use for the hydraulic-magnetic engine as illustrated in FIGS. 1A and 1B, in accordance with this disclosure.

FIG. 7 is an illustration of a method of use for the hydraulic-magnetic engine as illustrated in FIGS. 2A and 2B, in accordance with this disclosure.

FIG. 8 is an illustration of a method of use for the hydraulic-magnetic engine as illustrated in FIG. 3, in accordance with this disclosure.

FIG. 9 is an illustration of a method of use for the hydraulic-magnetic engine as illustrated in FIG. 4, in accordance with this disclosure.

FIG. 10 is a flow chart of a method 700 of utilizing multiple hydraulic-magnetic engines 100 as illustrated in FIG. 5.

Figure 1A:
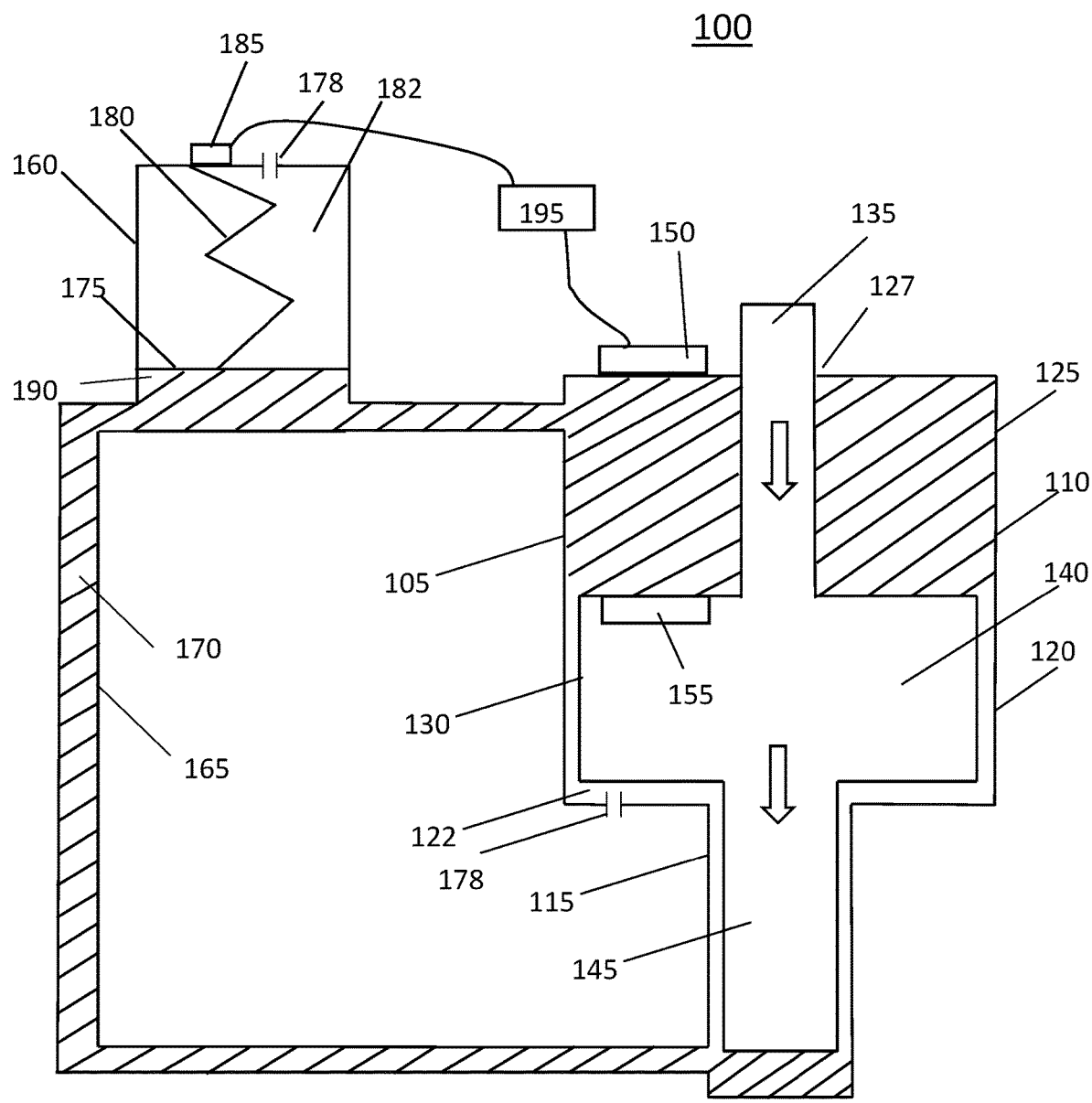
FIG. 1A is an illustration of a first position of the hydraulic-magnetic engine, in accordance with one exemplary embodiment.

These and other features of the present embodiments will be understood better by reading the following detailed description, taken together with the figures herein described. In the drawings each identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION OF THE DRAWINGS

A hydraulic-magnetic engine and related techniques are disclosed herein.

FIG. 1A illustrates an exemplary hydraulic-magnetic engine 100 in a first position. The hydraulic-magnetic engine has a chamber 105. The chamber 105 includes a piston chamber 110 and a plunger chamber 115. The piston chamber 110 has two sections, a proximal chamber 120 and a distal chamber 125. A piston 130 is located slidably within the chamber 105. The piston 130 is a continuous body with a piston rod 135, a middle section 140, and a piston plunger 145. The cross-sectional area of the piston middle section is greater than the cross-sectional area of the piston plunger. The piston rod 135 protrudes from the chamber 105 from an opening 127 such that the piston 130 is slidably engaged within the chamber 105. In the first position the piston plunger 145 is substantially contained within the plunger chamber 115, and the middle section 140, is substantially contained within the proximal chamber 120.

Further, there is at least one electromagnet 150 fixed to the chamber 105. Although the at least one electromagnet 150 is shown in the distal chamber 125, the at least one electromagnet 150 can be located in the proximal chamber 120, in the plunger chamber 115, outside the chamber 105, or in another appropriate location. The at least one electromagnet 150 may be fixed to the chamber 105. The at least one electromagnet 150 may be embedded within the wall of the chamber 105, such that the chamber 105 has a smooth interior.

Additionally, there is at least one permanent magnet 155 fixed to the piston 130. Although the at least one permanent magnet 155 is shown fixed to the middle section 140, the at least one permanent magnet 155 may be fixed, or embedded within any appropriate location on the piston 130 such that the at least one permanent magnet 155 is within a magnetic field of the at least one electromagnet 150. The piston position sensor 195 may monitor the position of the piston 130 by monitoring the position of the piston rod 135 or a crankshaft (not illustrated in FIG. 1A).

In one embodiment the at least one electromagnet 150 is in electrical communication with a piston position sensor 195. The piston position sensor 195 can be any appropriate device for sensing the position of the piston 130 and applying varying currents to the at least one electromagnet 150 to determine the polarity. The piston position sensor 195 may monitor the position of the piston 130 by monitoring the position of the piston rod 135, a crankshaft (not illustrated in FIG. 1A), or the position of the piston 130 itself within the chamber 105.

Figure 1B:
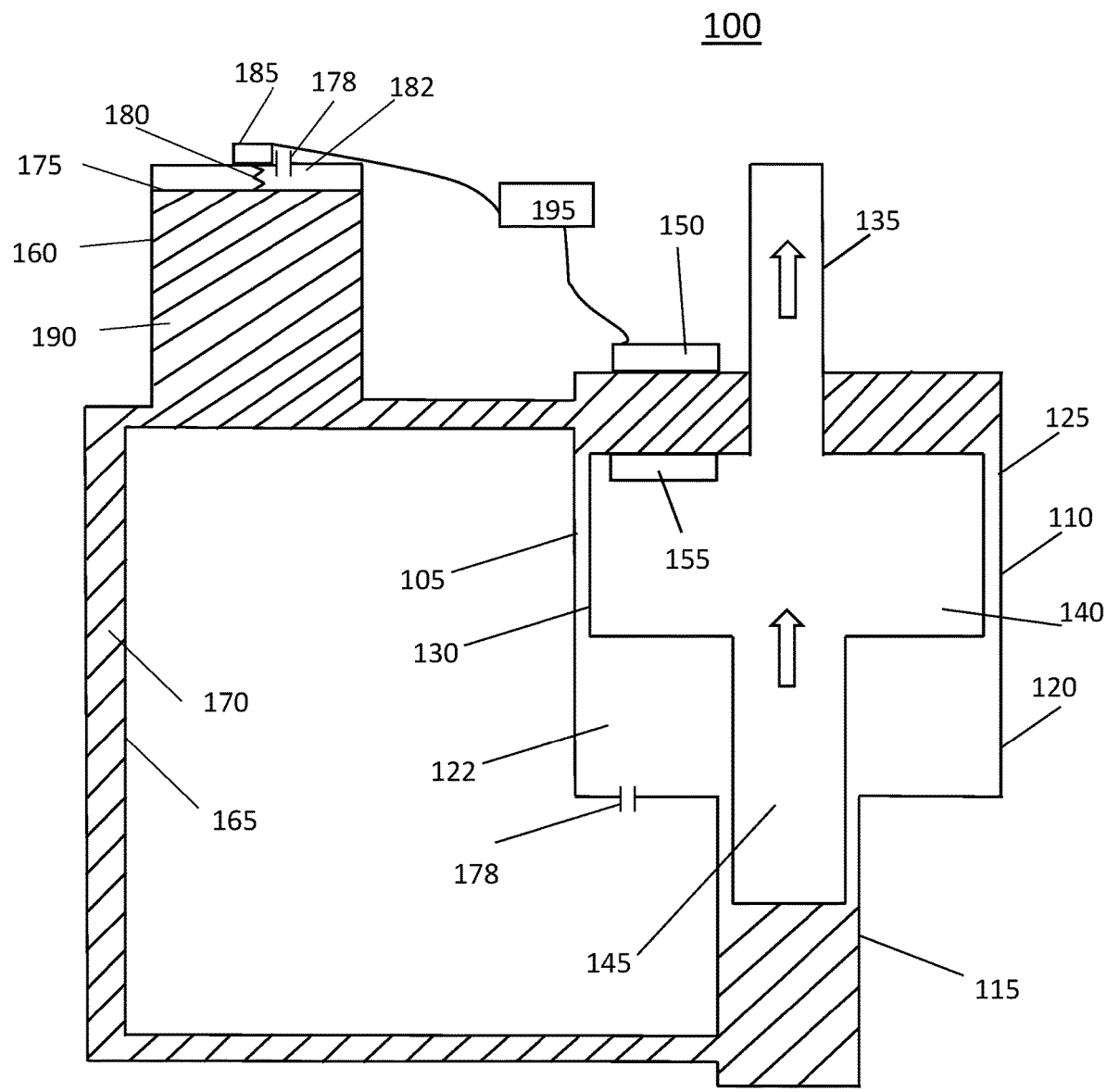
FIG. 1B is an illustration of a second position of the hydraulic-magnetic engine illustrated in FIG. 1A.

In one embodiment, when driving the piston 130 to the first position, the at least one electromagnet 150 and the at least one permanent magnet 155 have the same polarity, and when driving the piston 130 toward a second position, as in FIG. 1B, the at least one electromagnet 150 and the at least one permanent magnet 155 have opposing polarities. The at least one permanent magnet 155 has a fixed polarity and the at least one electromagnet 150 has a variable polarity as a function of the piston position sensor 195 varying its current.

FIG. 1A further illustrates the hydraulic-magnetic engine having a hydraulic compensator 160 in fluid communication with the chamber 105 via a hydraulic line 165. The hydraulic compensator 160 can be in line within the hydraulic line 165. Alternatively, the hydraulic compensator 160 can be in fluid communication with the hydraulic line 165 via a control valve.

A fluid 170 is contained within the chamber 105, the hydraulic compensator 160, and the hydraulic line 165. In the first position, the fluid 170 is contained substantially within the distal chamber 125, and the hydraulic line 165. However, there may be a relatively diminished amount of fluid 170 within the hydraulic compensator 160 and the plunger chamber 115. The fluid 170 can be water, oil, or another liquid or a gas. The fluid 170 may be selected based on its behavior under pressure, its viscosity, and its behavior under exposure to magnetic fields.

The hydraulic compensator 160 has a compensator reservoir 190 which stores fluid and pressure. The hydraulic compensator 160 may utilize a compensator piston 175 and a biasing element 180. Movement of the compensator piston 175 allows the compensator reservoir 190 to fill with fluid 170 when under fluid pressure as the piston 130 moves into the second position, and the fluid 170 is drawn from the hydraulic compensator 160 into the chamber 105 when the piston 130 drives toward the first position and the hydraulic compensator piston's movement in the direction of expanding the compensator reservoir is locked The threshold of the compensator reservoir 190 to expansion is low when moving from the first position to the second position, as to avoid unnecessary fluid pressure resistance when the fluid 170 moves from the distal chamber 125 to the plunger chamber 115 and replenishes the compensator reservoir 190. The motion of the piston 130 from the first position to the second position unlocks the locking mechanism 185 and allows the compensator piston 175 to move and expand the compensator reservoir 190 to permit pressurized fluid 170 to enter the compensator reservoir 190. The movement of the piston 130 from the second position to the first position initiates the lock of the locking mechanism 185, preventing any further expansion of the compensator reservoir 190, and diverts the fluid 170 from the compensator reservoir 190, to the distal chamber 125. In some embodiments the locking mechanism is a ratchet gear which only permits movement in one direction, such that locking the locking mechanism prevents expansion of the compensator reservoir 190 and unlocking the locking mechanism 185 permits expansion of the compensator reservoir 190. Any appropriate locking mechanism that can achieve equivalent results will be acceptable.

The downward pressure on the compensator piston 175 can be mechanically generated by the biasing element 180. In some embodiments the biasing element 180 can be a spring, but any appropriate biasing element would be acceptable. The biasing element 180 may impart an inconsequential force on the compensator piston 175 relative to the force from the fluid 170. Enough force is imparted on the compensator piston 175 to avoid any air space in the compensator reservoir 190 as the fluid 170 evacuates from the compensator reservoir 190.

In an embodiment, the chamber 105, the piston 130, the hydraulic line 165 and the hydraulic compensator 160 are made of a nonferrous material.

Within the chamber 105 there can be seals, gaskets, and piston rings, not shown, such that the fluid 170 is able to be contained under pressure within the chamber 105, hydraulic compensator 160, and the hydraulic line 165. One having ordinary skill in the art will recognize various structures that may be incorporated to maintain the necessary seals at the opening 127, between the middle section 140 of the piston 130 and the piston chamber 110, and between the piston plunger 145 and the plunger chamber 115.

FIG. 1B illustrates the exemplary hydraulic-magnetic engine 100 in a second position. In the second position, the middle section 140 is mostly contained within the distal chamber 125, and the piston plunger 145 is partially within the plunger chamber 115, and partially within the proximal chamber 120. In the second position, the at least one electromagnet 150 and the at least one permanent magnet 155 have opposing polarities, such that the at least one electromagnet 150 and the at least one permanent magnet 155 are attracted to one another. In the second position the compensator reservoir 190 is in a substantially expanded position.

The empty space 182 above the compensator piston 175 may have at least one pressure release valve 178 built into the walls to diminish the influence of air pressure possibly impeding the movement of the compensator piston 175. The air gap 122 within the proximal chamber 120 and beneath the middle section 140 may have pressure release valves 178 built into the walls to diminish the influence of air pressure possibly impeding the movement of the piston 130.

Further, in the second exemplary position the fluid 170 is mostly contained within the plunger chamber 115, the compensator reservoir 190, and the hydraulic line 165. In this embodiment there may be a minimal amount of fluid within the distal chamber 125. In one embodiment the fluid volume of the distal chamber 125 is equivalent to or less than the combination of the fluid volumes of the compensator reservoir 190. These volumes allow the fluid 170 to flow between the distal chamber 125, hydraulic compensator 160 and plunger chamber 115 to move the piston from the first position to the second position or vice versa. The hydraulic line 165 is constantly filled with fluid 170. At all times, the open volumetric space of the distal chamber 125, plunger chamber 115, and compensator reservoir 190 is completely filled with fluid 170 and all fluid 170 is contiguous.

The at least one electromagnet 150 and the at least one permanent magnet 155 form a magnet set. In one embodiment there is a first magnet set within the distal chamber 125, wherein there is an electromagnet fixed to the distal chamber 125, and a permanent magnet fixed to the piston middle section 140. Additionally, there may be a second magnet set within the plunger chamber 115, wherein an electromagnet is fixed to the plunger chamber 115, and a permanent magnet is fixed to the piston plunger 145. In this embodiment, the first magnet set and the second magnet set are in opposite attractive states. For example, if within the first magnetic set the electromagnet is magnetized to attract the permanent magnet, within the second magnetic set the electromagnet is magnetized to repel the permanent magnet.

Figure 2A:
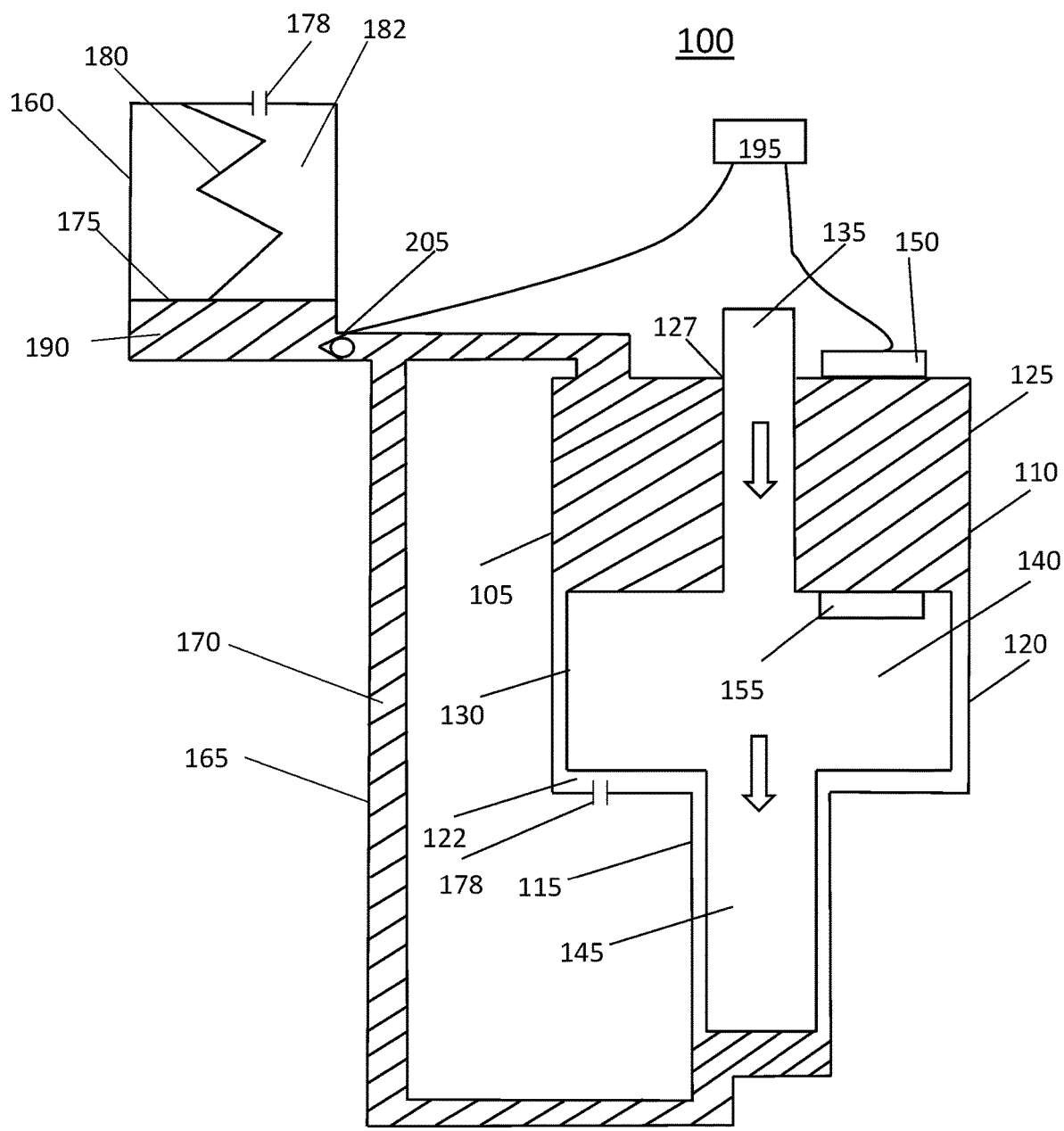
FIG. 2A is an illustration of a first position of the hydraulic-magnetic engine illustrated in FIG. 1A, with additional optional features.

FIG. 2A illustrates an alternative configuration of the hydraulic-magnetic engine 100. In this embodiment, the hydraulic compensator 160 is in fluid communication with the hydraulic line 165 via a control valve 205. The control valve 205 may be in electrical communication with the piston position sensor 195. The control valve 205 may be a bidirectional solenoid-actuated control valve. FIG. 2A illustrates the hydraulic-magnetic engine 100 engine in the first position wherein the control valve 205 is in a releasing position such that the fluid 170 flows from the hydraulic compensator 160 into the hydraulic line.

Figure 2B:
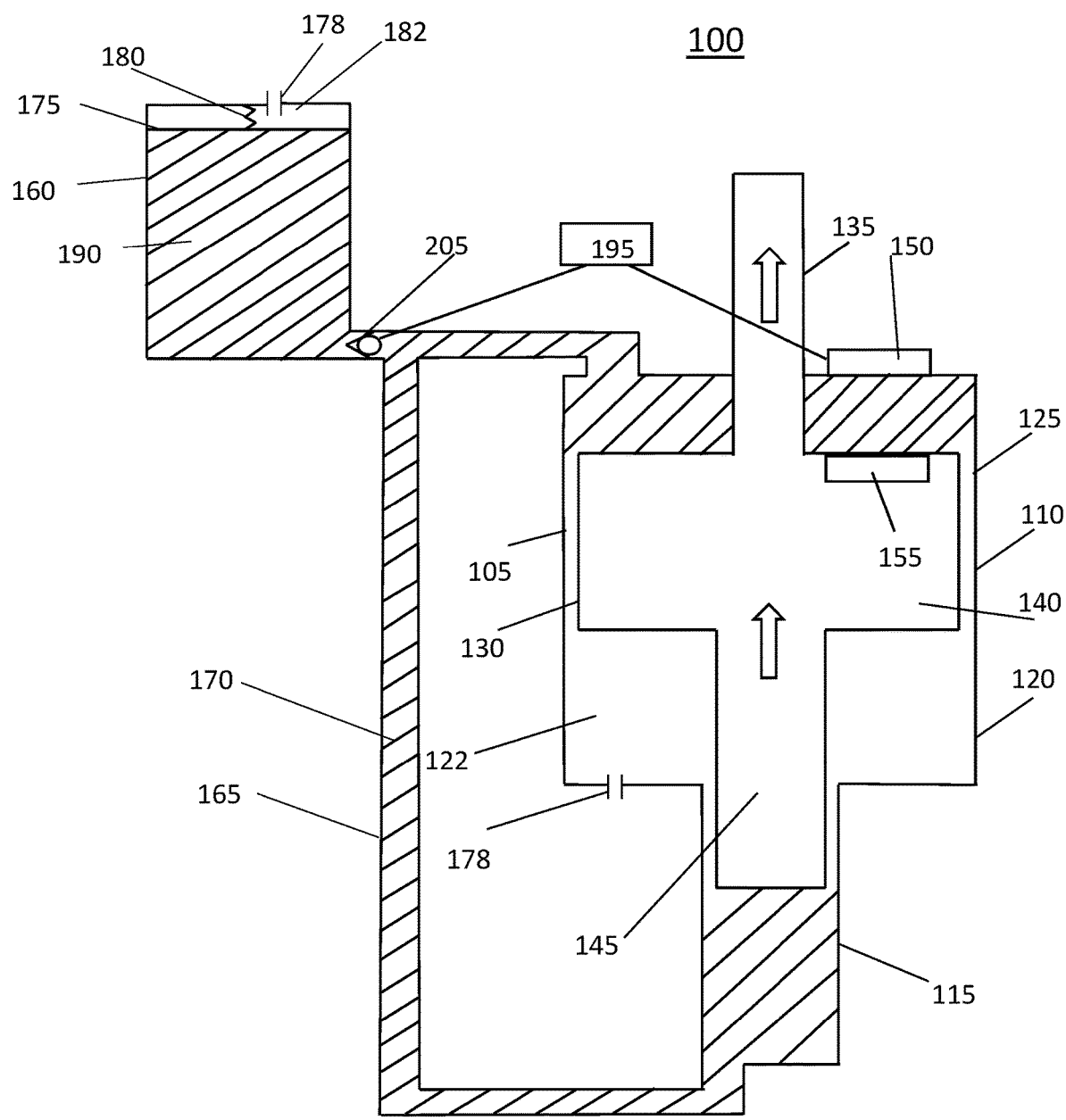
FIG. 2B is an illustration of a second position of the hydraulic-magnetic engine illustrated in FIG. 2A.

FIG. 2B illustrates the alternative configuration of the hydraulic-magnetic engine 100 in the second position. In the second position the control valve 205 is in a receiving position such that the fluid 170 may flow into the compensator reservoir 190.

Although FIGS. 1A-2B show only one hydraulic-magnetic engine, in some embodiments there are more than one hydraulic-magnetic engines in series. In one embodiment, when used in series, a first hydraulic-magnetic engine can be attached to a second hydraulic-magnetic engine via a common crankshaft, or any other known structure for combining the power output of multiple pistons. In this embodiment, when the first hydraulic-magnetic engine is in the first position, the second hydraulic-magnetic engine is in the second position. In this manner some of the energy from the second hydraulic-magnetic engine moving from the second position to the first position can be used to propel the first hydraulic-magnetic engine from the first position to the second position.

In some embodiments the piston rod 135 may be connected to a crankshaft so as to convert the linear motion into rotational energy.

Figure 3:
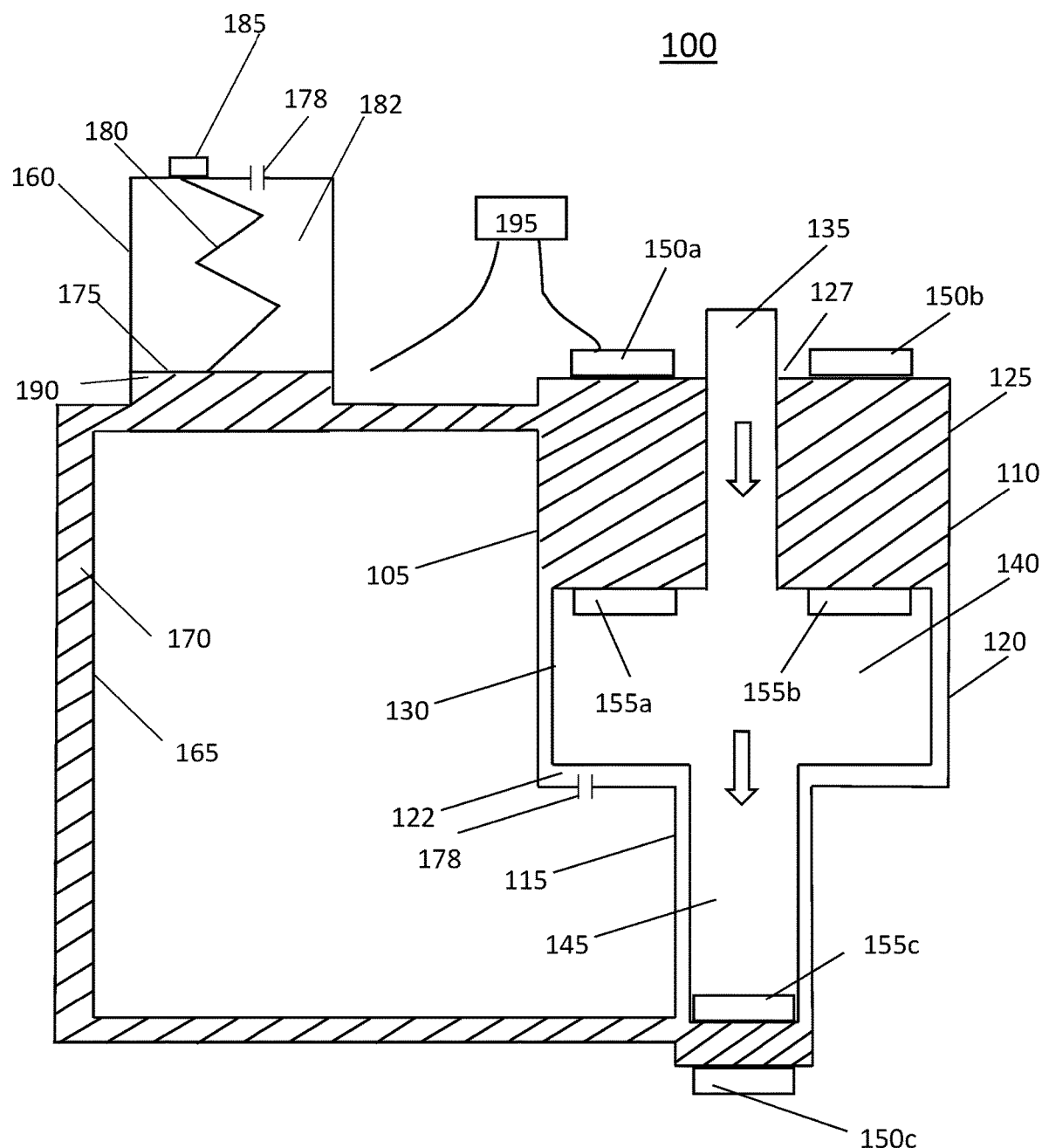
FIG. 3 is an illustration of a first position of the hydraulic-magnetic engine illustrated in FIG. 1A, with additional optional features.

FIG. 3 further illustrates the hydraulic-magnetic engine having a hydraulic compensator 160 in fluid communication with the chamber 105 via a hydraulic line 165. The hydraulic compensator 160 is illustrated in line within the hydraulic line 165. Alternatively, the hydraulic compensator 160 can be in fluid communication with the hydraulic line 165 via a control valve, as illustrated in FIG. 2A.

A fluid 170 is contained within the chamber 105, the hydraulic compensator 160, and the hydraulic line 165. In the position illustrated, the fluid 170 is contained substantially within the distal chamber 125, and the hydraulic line 165. However, there may be a relatively diminished amount of fluid 170 within the compensator reservoir 190 of the hydraulic compensator 160 and the plunger chamber 115.

The hydraulic compensator 160 has a compensator reservoir 190 which stores fluid and pressure. The hydraulic compensator 160 may utilize a compensator piston 175 and a biasing element 180. The biasing element 180 can be comprised of a weight, spring, gas filled bladder, or any other suitable mechanism for imposing force to move the compensator piston 175 to contract the volume of the compensator reservoir as the piston 130 moves from the second position to the first position. When unlocked, movement of the compensator piston 175 allows the compensator reservoir 190 to expand with fluid 170 when under fluid pressure as the piston 130 moves into the second position. When the piston 130 drives toward the first position the fluid 170 is drawn from the compensator reservoir 190 into the chamber 105.

Within the chamber 105 there can be seals, gaskets, and piston rings, not shown, such that the fluid 170 under pressure is able to be contained within the chamber 105, hydraulic compensator 160, and the hydraulic line 165 while keeping the fluid out of the proximal chamber 120 and the empty space 182. One having ordinary skill in the art will recognize various structures that may be incorporated to maintain the necessary seals at the opening 127, between the middle section 140 of the piston 130 and the piston chamber 110, and between the plunger 145 and the plunger chamber 115 to prevent fluid from entering the proximal chamber 120.

As previously described, the at least one electromagnet 150 and the at least one permanent magnet 155 form a magnet set. As illustrated in FIG. 3, multiple magnet sets are conceivable and within the scope of the present disclosure. FIG. 3 contains a first magnet set within the distal chamber 125, wherein there is a first electromagnet 150a fixed to the distal chamber 125, and a first permanent magnet 155a fixed to the middle section 140. There is a second magnet set within the distal chamber 125, wherein there is a second electromagnet 150b fixed to the distal chamber 125, and a second permanent magnet 155b fixed to the piston middle section 140. Additionally, there may be a third magnetic set within the plunger chamber 115, wherein a third electromagnet 150c is fixed to the plunger chamber 115, and a third permanent magnet 155c is fixed to the piston plunger 145. In this embodiment the first magnet set and the second magnet set are in similar attractive states and in an opposite state from the third magnet set. For example, if within the first and second magnetic sets the electromagnets 150a, 150b are magnetized to attract the permanent magnets 155a, 155b, then within the third magnetic set the third electromagnet 150c is magnetized to repel the third permanent magnet 155c.

As illustrated in FIG. 3, the electromagnets 150a, 150b, 150c are flush with an interior surface of the chamber 105. The permanent magnets 155a, 155b, 155c are flush with an exterior surface of the piston 130. This location of the electromagnets 150a, 150b, 150c and the permanent magnets 155a, 155b, 155c provides full range of motion for the piston 130 within the chamber 105 unobstructed.

One having ordinary skill in the art will recognize that the first and second electromagnets 150a, 150b could be replaced with a single electromagnet positioned across a substantial surface of the distal chamber 125. In this regard, one electromagnet could influence multiple permanent magnets 155a, 155b. While the magnet sets are illustrated with a 1:1 ratio of electromagnets 150 to permanent magnets 155, other ratios are within the scope of the present disclosure.

Figure 4A:
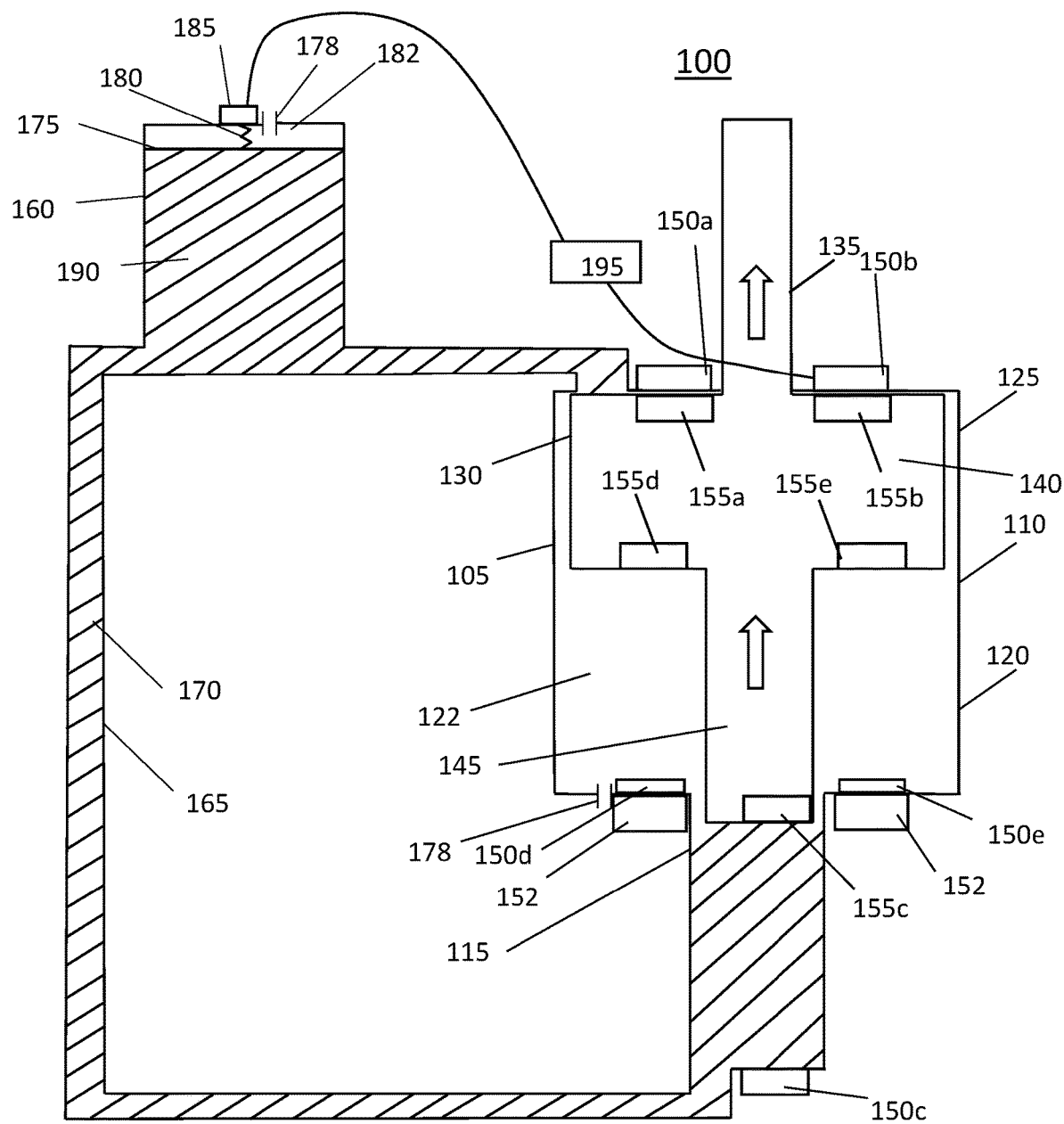
FIG. 4A is an illustration of the hydraulic-magnetic engine illustrated in FIG. 3 with additional optional features arriving at a second position.

FIG. 4A is an illustration of the hydraulic-magnetic engine illustrated in FIG. 3 with additional optional features arriving at a second position. FIG. 4A further illustrates the hydraulic-magnetic engine having a hydraulic compensator 160 in fluid communication with the chamber 105 via a hydraulic line 165. The hydraulic compensator 160 is illustrated in line within the hydraulic line 165. Alternatively, the hydraulic compensator 160 can be in fluid communication with the hydraulic line 165 via a control valve, as illustrated in FIG. 2A.

As illustrated in FIG. 4A, a fluid 170 is contained substantially within the compensator reservoir 190, the hydraulic line 165, and the plunger chamber 115.

The hydraulic compensator 160 has a compensator reservoir 190 which stores fluid 170 and pressure. The hydraulic compensator 160 may utilize a compensator piston 175 and a biasing element 180. Movement of the compensator piston 175 allows the compensator reservoir 190 to expand with fluid 170 when under fluid pressure as the piston 130 moves into the second position. As the piston 130 drives toward the first position, the fluid 170 is drawn from the hydraulic compensator 160 into the chamber 105 while the movement of the compensator piston 175 is locked against expansion of the compensator reservoir 190.

Within the chamber 105 there can be seals, gaskets, and piston rings, not shown, such that the fluid 170 is able to be contained within the chamber 105, hydraulic compensator 160, and the hydraulic line 165 while keeping the fluid out of the proximal chamber 120 and the empty space 182. One having ordinary skill in the art will recognize various structures that may be incorporated to maintain the necessary seals at the opening 127, between the middle section 140 of the piston 130 and the piston chamber 110, and between the plunger 145 and the plunger chamber 115 to prevent fluid from entering the proximal chamber 120.

Figure 4B:
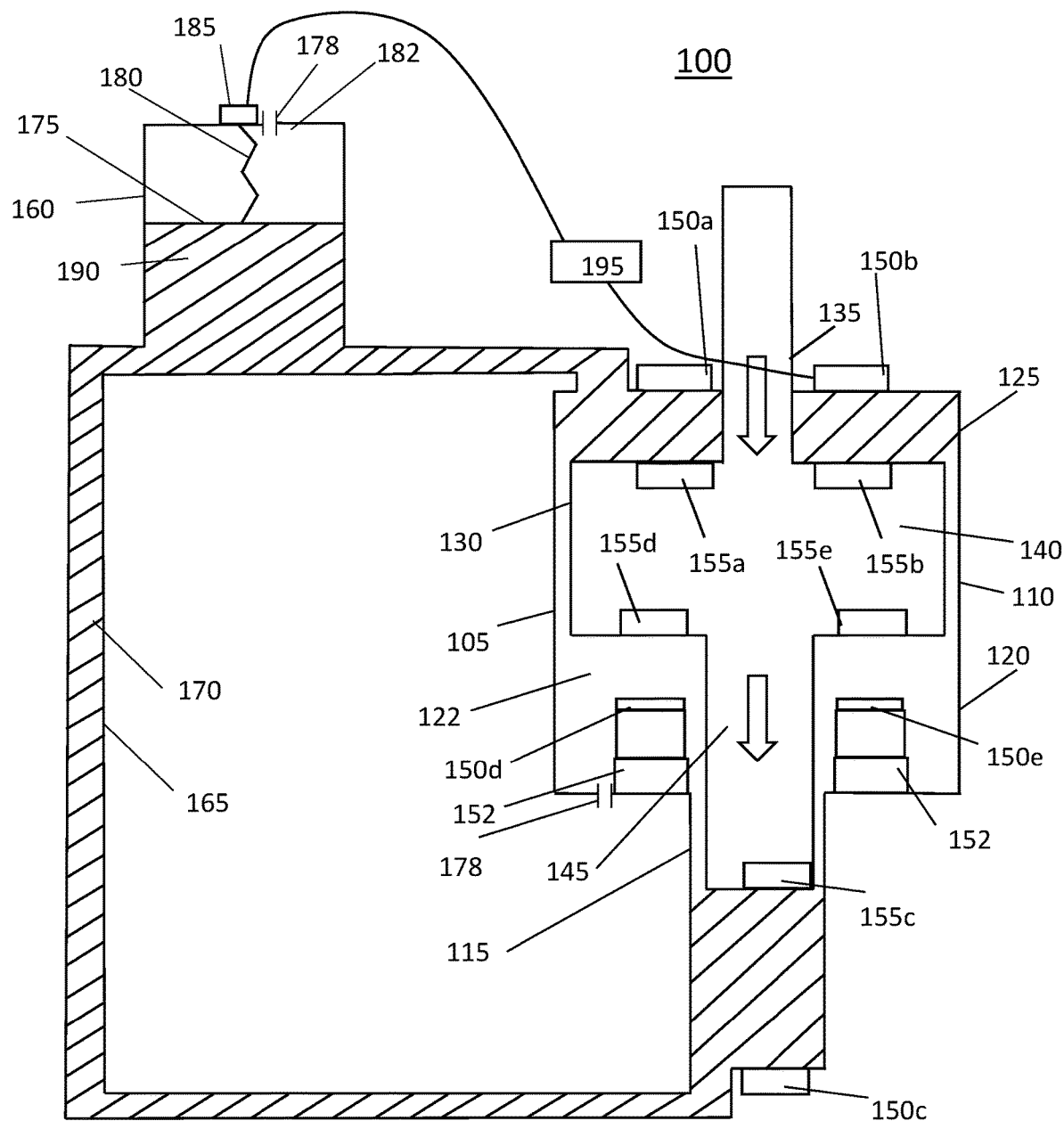
FIG. 4B is an illustration of the hydraulic-magnetic engine illustrated in FIG. 4A moving toward a first position.
Figure 4C:
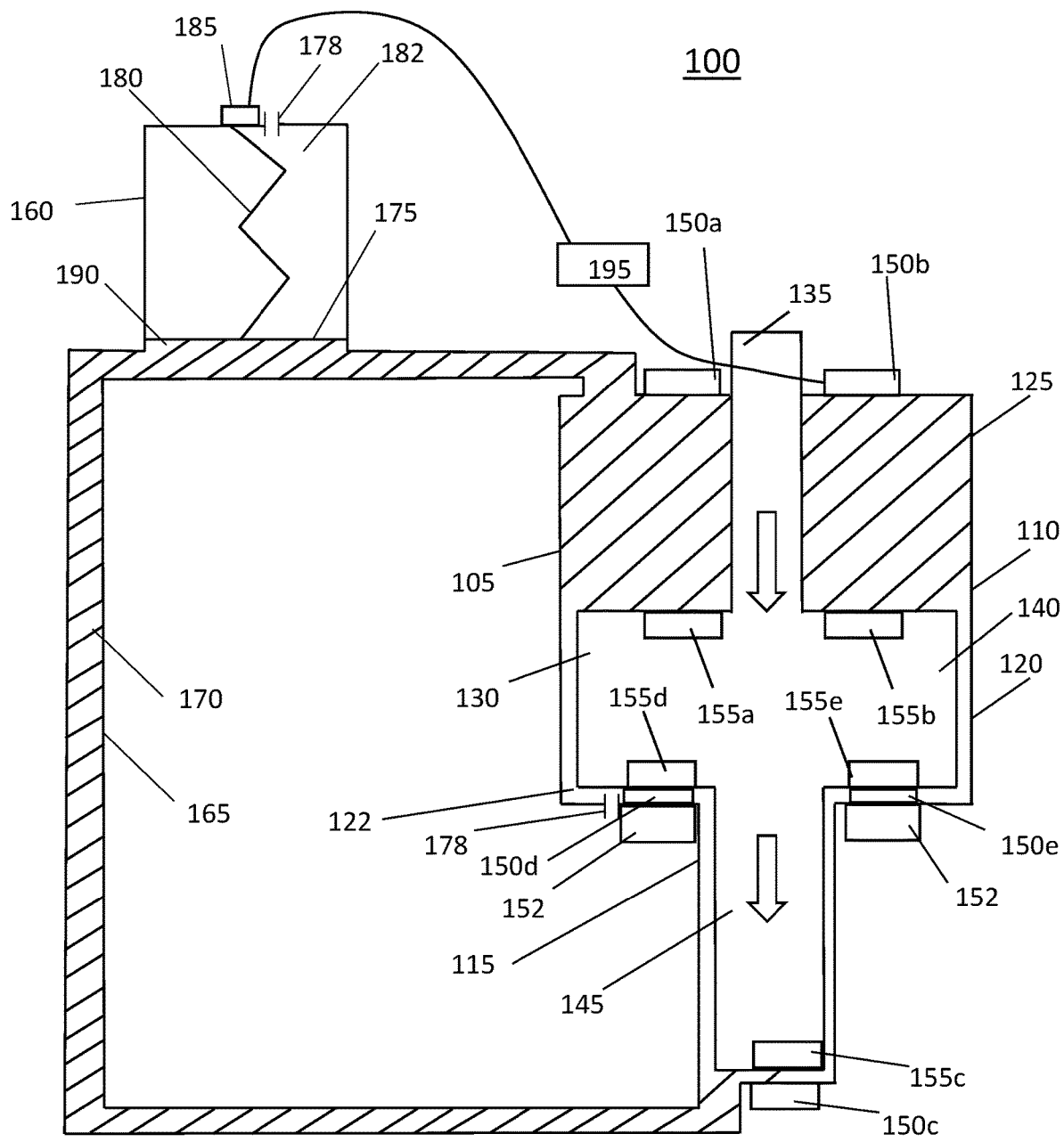
FIG. 4C is an illustration of the hydraulic-magnetic engine illustrated in FIG. 4A arriving at the first position.

As previously described, the at least one electromagnet 150 and the at least one permanent magnet 155 form a magnet set. As illustrated in FIGS. 4A, 4B, and 4C multiple magnet sets are conceivable and within the scope of the present disclosure. FIGS. 4A, 4B, and 4C contain a first magnet set within the distal chamber 125, wherein there is a first electromagnet 150a fixed to the distal chamber 125, and a first permanent magnet 155a fixed to the middle section 140. There is a second magnet set within the distal chamber 125, wherein there is a second electromagnet 150b fixed to the distal chamber 125, and a second permanent magnet 155b fixed to the middle section 140. Additionally, there may be a third magnetic set within the plunger chamber 115, wherein a third electromagnet 150c is fixed to the plunger chamber 115, and a third permanent magnet 155c is fixed to the piston plunger 145. A fourth and fifth magnet set are also provided, with a fourth permanent magnet 155d and a fifth permanent magnet 155e located in the middle section 140 flush with the piston 130. A fourth electromagnet 150d and a fifth electromagnet 150e are located in the proximal chamber 120.

FIG. 4B is an illustration of the hydraulic-magnetic engine illustrated in FIG. 4A moving toward a first position. The fourth electromagnet 150d and the fifth electromagnet 150e are located on telescoping elements 152. The telescoping elements 152 allow the fourth electromagnet 150d and the fifth electromagnet 150e to reach away from a surface of the proximal chamber 120 by magnetic attraction, as illustrated in FIG. 4B. The telescopic elements 122 extend close to the fourth permanent magnet 155d and fifth permanent magnet 155e when the electromagnets 150d, 150e are attracted to these permanent magnets 155d, 155e. As is known to those having ordinary skill in the art, the forces acting on the magnet sets are stronger the closer the permanent magnet 155 and electromagnet 150 become.

FIG. 4C is an illustration of the hydraulic-magnetic engine illustrated in FIG. 4A moving arriving at the first position. When the middle section 140 is fully within the proximal chamber 120, the telescoping elements 152 withdraw the fourth electromagnet 150d and fifth electromagnet 150e by being compressed into a position flush with an interior surface of the chamber 105. As the proximal chamber 120 does not contain pressurized fluid and utilizes the pressure release valve 178 to minimize pressure, the telescoping elements 152 may move partially through a wall of the chamber 105 without requiring a seal. In this embodiment the first magnet set and the second magnet set are in similar attractive states and in an opposite state from the third, fourth, and fifth magnet sets. For example, if within the first and second magnetic sets the electromagnets 150a, 150b are magnetized to attract the permanent magnets 155a, 155b, the third, fourth, and fifth electromagnets 150c, 150d, 150e are magnetized to repel the third, fourth, and fifth permanent magnets 150c, 150d, 155e. A piston position sensor 195 is in electrical communication with all these electromagnets 150a, 150b, 150c, 150d, 150e, such that the piston position sensor 195 sends a signal to reverse the current to the electromagnets 150a, 150b, 150c, 150d, 150e to reverse their polarities at the appropriate time. In one embodiment, the telescoping elements 152 are made out of a nonferrous material.

One having ordinary skill in the art will recognize that the first and second electromagnets 150a, 150b could be replaced with a single electromagnet positioned across a substantial surface of the distal chamber 125. In this regard, one electromagnet could influence multiple permanent magnets 155a, 155b. While the magnet sets are illustrated with a 1:1 ratio of electromagnets 150 to permanent magnets 155, other ratios are within the scope of the present disclosure.

Figure 5:
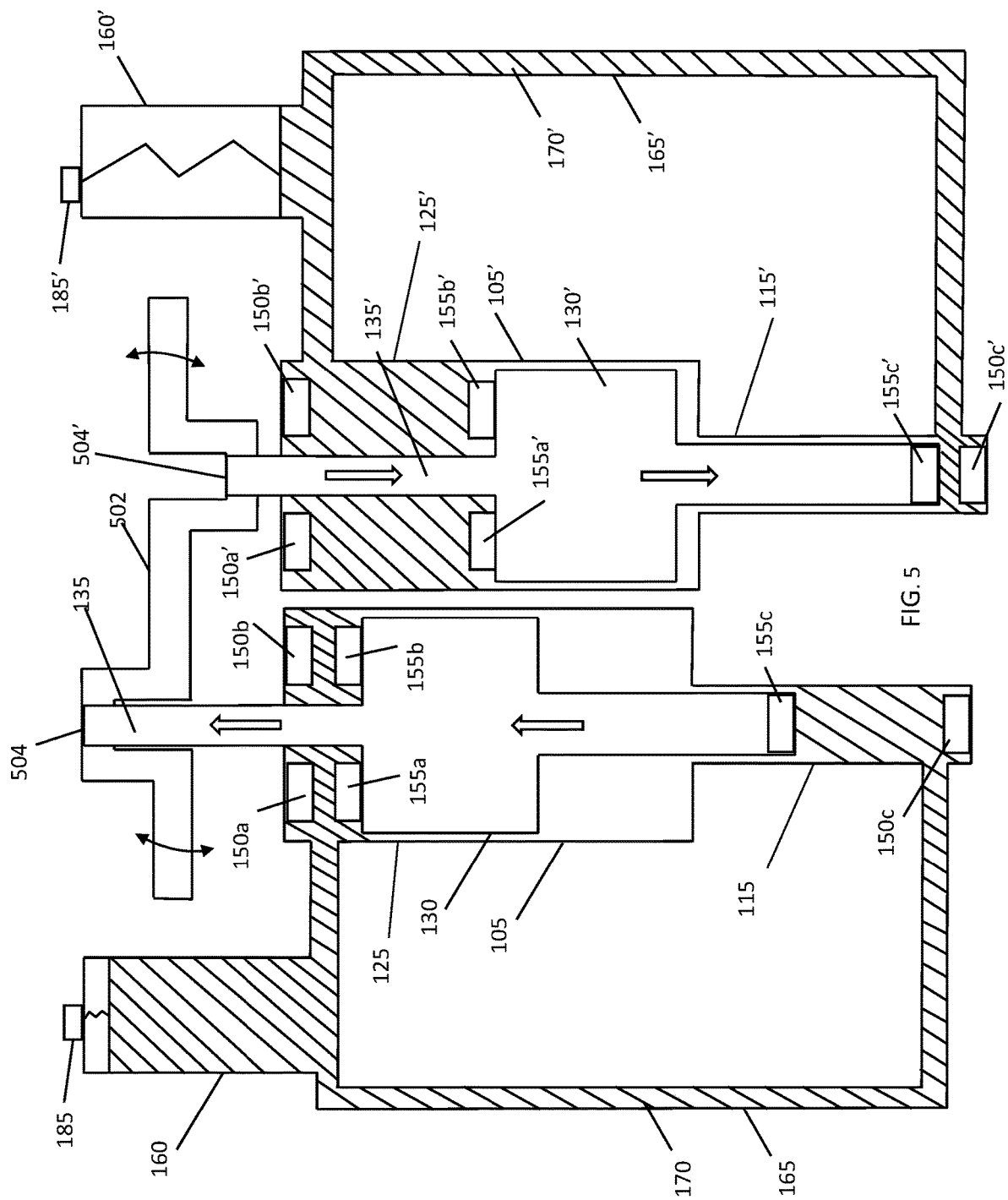
FIG. 5 is an illustration of a combination of two of the hydraulic-magnetic engines illustrated in FIG. 3, with additional optional features.

FIG. 5 is an illustration of a combination of two of the hydraulic-magnetic engines 100 illustrated in FIG. 3, with additional optional features. A crankshaft 502 is introduced to interconnect two pistons 130, 130' and translate the work of the pistons 130, 130' to a mechanical load. Translation of the kinetic energy of pistons through a crankshaft is known to those having ordinary skill in the art and the details are not repeated herein. The crankshaft 502 will have a joint 504 to connect with each piston rod 135, 135'. While only two pistons 130, 130' are illustrated in FIG. 6, one having ordinary skill in the art will recognize similar arrangements may be constructed to combine the output of any number of pistons 130, 130'. It is noted that each piston 130, 130' has an independent set of electromagnets 150a-c, 150a'-c' and permanent magnets 155a-c, 155a-c', as well as a dedicated hydraulic compensator 160, 160', hydraulic line 165, 165', and fluid 170, 170'. The electromagnets 150a-c, 150a-c' may be interconnected electrically to synchronize the movement of multiple pistons 130, 130', using either one piston position sensor 195 or multiple networked piston position sensors 195.

FIG. 6 is a flow chart illustrating an exemplary method 300 of using the hydraulic-magnetic engine 100 as illustrated in FIG. 1A, in accordance with the disclosed structures. It should be noted that any process descriptions or blocks in flow charts should be understood as representing steps that include one or more instructions for implementing specific functions in the process, and alternate implementations are included within the scope of the present disclosure in which functions may be executed out of order from that shown or discussed, including substantially concurrently or in reverse order, unless order is specifically identified, as would be understood by those reasonably skilled in the art of the present disclosure.

The hydraulic-magnetic engine 100 begins in the first position with the piston plunger 145 occupying to the maximum extent the plunger chamber 115, as illustrated in FIG. 1A. At step 310, a piston position sensor 195 senses a position of the piston 130. At step 320, the piston position sensor 195 sends a signal to the locking mechanism 185 and the electromagnet 150. At step 330, the locking mechanism 185 is unlocked. At step 340, an electrical current is provided, via any suitable power source, to induce a polarity in the at least one electromagnet 150 opposite to the polarity of the at least one permanent magnet, thereby drawing the at least one permanent magnet 155 towards the at least one electromagnet 150. At step 350, the piston 130 is moving from the first position to the second position and the fluid 170 is moved from the distal chamber 125 to the hydraulic compensator 160 and the plunger chamber 115. In a further step of the method 300, step 360, the piston position sensor 195 determines the piston 130 is in the second position, as illustrated in FIG. 1B and sends a signal to reverse a current to the at least one electromagnet 150. The reversed current reverses the polarity of the at least one electromagnet 150 and generates a repulsive force between the at least one electromagnet 150 and the at least one permanent magnet 155, moving the piston 130 toward the first position. The piston position sensor 195 also sends a signal to the locking mechanism 185 to lock the hydraulic compensator 160 in step 370. In one embodiment, at all times the at least one electromagnet 150 is energized, but with variable polarity.

FIG. 7 is a flow chart illustrating an exemplary method 400 of using the hydraulic-magnetic engine 100 as illustrated in FIG. 2A, in accordance with the disclosed structures. The hydraulic-magnetic engine 100 begins in the first position, as illustrated in FIG. 2A. At step 410, a piston position sensor 195 senses a position of the piston 130. At step 420, the piston position sensor 195 sends a signal to the control valve 205 and to the at least one electromagnet 150. At step 430, the control valve 205 is manipulated to receive fluid 170 in the hydraulic compensator 160. At step 440, an electrical current is varied to the at least one electromagnet 150 to generate a polarity opposite to the at least one permanent magnet 155, drawing the at least one permanent magnet 155 toward the at least one electromagnet 150. At step 450, the piston 130 is moving from the first position to the second position and the fluid 170 is moved from the distal chamber 125 to the hydraulic compensator 160 and the plunger chamber 115. In a further step of the method 400, step 460, the piston position sensor 195 determines the piston 130 is in the second position, as illustrated in FIG. 2B, and sends a signal to reverse a current to the at least one electromagnet 150. The reversed current generates a repulsive force between the at least one electromagnet 150 and the at least one permanent magnet 155 moving the piston 130 toward the first position. The piston position sensor 195 also sends a signal to the control valve 205 to permit fluid to exit the hydraulic compensator 160 in step 470. In one embodiment, at all times the at least one electromagnet 150 is energized, but with variable polarity.

FIG. 8 is a flow chart illustrating an exemplary method 500 of using the hydraulic-magnetic engine 100 as illustrated in FIG. 3, in accordance with the disclosed structures. The hydraulic-magnetic engine 100 begins in the first position, as illustrated in FIG. 3. At step 510, a piston position sensor 195 senses a position of the piston 130. At step 520, the piston position sensor 195 sends a signal to the locking mechanism 185 and to the electromagnets 150a, 150b, 150c. At step 530, the locking mechanism 185 unlocks the compensator piston 175 to permit expansion of the compensator reservoir 190. At step 540, an electrical current is varied to the electromagnets 150a, 150b, 150c, the electromagnetic fields drawing the permanent magnets 155a, 155b, towards the electromagnets 150a, 150b, while repulsing the third permanent magnet 155c from the third electromagnet 150c. At step 550, the piston 130 is moving from the first position to the second position and the fluid 170 is moved from the distal chamber 125 to the compensator reservoir 190 and the plunger chamber 115. In a further step of the method 500, step 560, the piston position sensor 195 determines the piston 130 is in the second position and sends a signal to reverse an electrical current to the electromagnets 150a, 150b, 150c, generating a repulsive force between the electromagnets 150a, 150b, and the permanent magnets 155a, 155b, and an attractive force between third permanent magnet 155c and the third electromagnet 150c, moving the piston 130 toward the first position. The piston position sensor 195 also sends a signal to the locking mechanism 185 to lock the compensator piston 175 in step 570 to prevent any further expansion of the compensator reservoir. In one embodiment, at all times electromagnets 150a, 150b and 150c are energized, but with variable polarity.

FIG. 9 is a flow chart illustrating an exemplary method 600 of using the hydraulic-magnetic engine 100 as illustrated in FIG. 4, in accordance with the disclosed structures. The hydraulic-magnetic engine 100 begins in the first position. At step 610, a piston position sensor 195 senses a position of the piston 130. At step 620, the piston position sensor 195 sends a signal to the locking mechanism 185 and to the electromagnets 150a, 150b, 150c, 150d, 150e. At step 630, the locking mechanism 185 unlocks the hydraulic compensator 160. At step 640, a current is applied to the electromagnets 150a, 150b, 150c, 150d, 150e, the electromagnetic fields drawing the permanent magnets 155a, 155b, towards the electromagnets 150a, 150b, while repulsing the permanent magnets 155c, 155d, 155e from the electromagnets 150c, 150d, 150e. As electromagnets 150d, 150e repulse permanent magnets 155d, 155e, the telescoping elements 152 withdraw the electromagnets 150d, 150e flush or near an inner wall of the chamber 105. At step 650, the piston 130 is moving from the first position to the second position and the fluid 170 is moved from the distal chamber 125 to the hydraulic compensator 160 and the plunger chamber 115. In a further step of the method 600, step 660, the piston position sensor 195 determines the piston 130 is in the second position, as illustrated in FIG. 4, and sends a signal to reverse a current to the electromagnets 150a, 150b, 150c, 150d, 150e generating a repulsive force between the electromagnets 150a, 150b, and the permanent magnets 155a, 155b, and an attractive force between permanent magnets 155c, 155d, 155e and the electromagnets 150c, 150d, 150e moving the piston 130 toward the first position. The attractive force of the electromagnets 150d, 150e extends the telescoping elements 152 at least until the permanent magnets 155d, 155e contact the electromagnets 150d, 150e. The piston position sensor 195 also sends a signal to the locking mechanism 185 to lock the hydraulic compensator 160 in step 670. In one embodiment, at all times electromagnets 150a, 150b, 150c, 150d, and 150e are energized, but with variable polarity.

The movement of the piston 130 between the first and second positions may move a crankshaft as to change the linear motion of the piston 130 into rotary motion. In one embodiment the crankshaft is attached to the piston rod 135.

FIG. 10 is a flow chart of a method 700 of utilizing multiple hydraulic-magnetic engines 100 as illustrated in FIG. 5. As illustrated in FIG. 5, a first piston 130 is in the second position and a second piston 130' is in the first position. In step 710, a piston position sensor 195 (as shown in FIG. 3) senses a position of the crankshaft 502. In step 720 the piston position sensor 195 sends signals to the locking mechanisms 185, 185' and the electromagnets 150a, 150b, 150c, 150a', 150b', 150c'. In step 730, the locking mechanisms 185, 185' lock the first hydraulic compensator 160 and unlocks the second hydraulic compensator 160'. In step 740, a current is applied to the electromagnets 150a, 150b, 150c, 150a', 150b', 150c', the electromagnetic fields drawing the permanent magnets 155c, 155a', 155b' toward the electromagnets 150c, 150a', 150b' while repulsing the permanent magnets 155a, 155b, 155c' from the electromagnets 150a, 150b, and 150c'. In step 750, the first piston 130 is moving from the second position to the first position and the fluid 170 is moving from the hydraulic compensator 160 and the plunger chamber 115 to the distal chamber 125. In step 760, concurrent with step 750, the second piston 130' is moving from the first position to the second position and the fluid 170' is moving from the distal chamber 125' to the hydraulic compensator 160 and the plunger chamber 115'. In step 770, once the piston position sensor 195 determines the first piston 130 is in the first position and the second piston 130' is in the second position, the piston position sensor 195 sends a signal to reverse the state of the locking mechanisms 185, 185' and the polarity of the electromagnets 150a, 150b, 150c, 150a', 150b', 150c'.

The foregoing description of example embodiments has been presented for the purposes of illustration and description. It is not intended to be exhaustive or to limit the present disclosure to the precise forms disclosed. Many modification and variations are possible in light of this disclosure. Future-filed applications claiming priority to this application may claim the disclosed subject matter in a different manner and generally may include any set of one or more limitations as variously disclosed or otherwise demonstrated herein.

What is claimed is:

1. A hydraulic-magnetic engine comprising:
   a chamber having a piston chamber and a plunger chamber, wherein the piston chamber comprises a proximal chamber, and a distal chamber;
   a piston slidably engaged and partially within the chamber, the piston including a piston rod, a middle section, and a piston plunger, wherein the piston rod is partially protruding from the piston chamber;
   at least one electromagnet fixed to the chamber;
   at least one permanent magnet fixed to the piston and within an electromagnetic field of the at least one electromagnet;
   a fluid contained within the chamber;
   a piston position sensor in electrical communication with the at least one electromagnet; and
   a hydraulic compensator in fluid communication with the piston chamber and the plunger chamber, the hydraulic compensator further comprising a compensator piston, the compensator piston further comprising a lock in electrical communication with the piston position sensor.

2. The hydraulic-magnetic engine of claim 1, further comprising a hydraulic line connecting the piston chamber, the plunger chamber, and the hydraulic compensator.

3. The hydraulic-magnetic engine of claim 2, further comprising a control valve connected within the hydraulic line between the hydraulic compensator and the chamber.

4. The hydraulic-magnetic engine of claim 3 wherein the control valve is in electrical communication with the piston position sensor.

5. The hydraulic-magnetic engine of claim 3, wherein the control valve is a solenoid actuated bi-directional control valve.

6. The hydraulic-magnetic engine of claim 1, wherein the lock is a solenoid activated switch.

7. The hydraulic-magnetic engine of claim 1, wherein the distal chamber comprises a distal volume, the plunger chamber comprises a plunger volume, and the hydraulic compensator comprises a compensator reservoir volume, wherein the distal volume is less than a combination of the plunger volume and the compensator reservoir volume.

8. The hydraulic-magnetic engine of claim 1, wherein the at least one electromagnet further comprises at least one distal electromagnet fixed within the piston chamber, and at least one plunger electromagnet fixed within the plunger chamber.

9. The hydraulic-magnetic engine of claim 1, wherein the at least one permanent magnet further comprises at least one permanent distal magnet fixed to the piston, and at least one permanent plunger magnet fixed to the piston plunger.

10. The hydraulic magnetic engine of claim 1, wherein the at least one electromagnet is fixed to the chamber with at least one telescoping element.

11. The hydraulic magnetic engine of claim 10, wherein the telescoping element is formed with multiple elements capable of extending into the chamber and capable of moving into a position at least partially outside the chamber.

12. The hydraulic magnetic engine of claim 1, wherein the piston further comprises at least two pistons, each of the pistons having the piston rod, further comprising a crankshaft connected to each of the piston rods.

13. The hydraulic magnetic engine of claim 1, wherein the hydraulic compensator, whether locked or unlocked, maintains completely full fluid volume of all available volumetric space.

14. A method of using a hydraulic-magnetic engine, the method comprising:
    moving the hydraulic-magnetic engine into a first position, wherein the hydraulic-magnetic engine comprises,
      a chamber having a piston chamber and a plunger chamber, wherein the piston chamber comprises a proximal chamber, and a distal chamber;
      a piston slidably engaged partially within the chamber, the piston comprising a piston rod, a middle section, and a piston plunger, wherein the piston rod is partially protruding from the piston chamber;
      at least one electromagnet fixed to the chamber;
      at least one permanent magnet fixed to the piston and within an electromagnetic field of the at least one electromagnet;
      a fluid contained within the chamber;
      a hydraulic compensator in fluid communication with the piston chamber and the plunger chamber; and
      a hydraulic line connecting the piston chamber, the plunger chamber, and the hydraulic compensator,
    wherein in the first position the middle section is contained mostly within the proximal chamber, and the fluid is contained within the distal chamber and the hydraulic line;
    reversing a current to the at least one electromagnet to change a polarity of the at least one electromagnet, wherein changing the polarity induces the piston to move to a second position wherein the middle section is contained mostly within the distal chamber, and the fluid is mostly contained within the plunger chamber, the hydraulic compensator, and the hydraulic line; and
    creating an attraction within a distal magnetic field wherein the distal magnetic field comprises at least one distal electromagnet positioned within the distal chamber and at least one permanent distal magnet located on the middle section, and creating a repulsion between a plunger magnetic field wherein the plunger magnetic field comprises at least one plunger electromagnet located within the plunger chamber, and at least one plunger permanent magnet located on the piston plunger.

15. The method of claim 14, further comprising sensing a position of the piston using a piston position sensor wherein the piston position sensor is in electrical communication with the at least one electromagnet, whereby the piston position sensor may be a crankshaft position sensor.

16. The method of claim 15, further comprising disengaging a compensator piston lock, connected to the compensator piston in the hydraulic compensator, and allowing the fluid to fill the compensator reservoir, wherein the compensator piston lock is in electrical communication with the piston position sensor.

17. The method of claim 15, further comprising opening a control valve, wherein the control valve is in electrical communication with the piston position sensor.

18. The method of claim 14, further comprising engaging the hydraulic compensator in fluid communication with the piston chamber and the plunger chamber wherein the fluid compresses the compensator piston and expands the compensator reservoir as the fluid is expelled from the piston chamber.

19. The method of claim 18, further comprising sending an electrical current to the at least one distal electromagnet, and the at least one plunger electromagnet, wherein the electrical current changes the polarity of the distal electromagnet, and the plunger electromagnet.

20. The method of claim 19, further comprising locking the compensator piston and evacuating the fluid from the hydraulic compensator and biasing the compensator piston to contract the compensator reservoir.

21. The method of claim 14, wherein the at least one electromagnet is constantly powered with only a variation in polarity.

22. The method of claim 14, further comprising magnetically propelling the piston cyclically between the first position and second position up and down and constantly exchanging fluid between the distal chamber and the plunger chamber and the compensator reservoir.

23. A method of using a hydraulic-magnetic engine, the method comprising:
moving the hydraulic-magnetic engine into a first position, wherein the hydraulic-magnetic engine comprises,
a chamber having a piston chamber and a plunger chamber, wherein the piston chamber comprises a proximal chamber and a distal chamber;
a piston slidably engaged partially within the chamber, the piston comprising a piston rod, a middle section, and a piston plunger, wherein the piston rod is partially protruding from the piston chamber;
at least one electromagnet fixed to the chamber, wherein the at least one electromagnet is fixed to the chamber with at least one telescoping element, further comprising telescopically extending the at least one electromagnet into the chamber when the at least one electromagnet is attracted to the at least one permanent magnet and at least partially withdrawing the at least one telescoping element outside the chamber when the at least one electromagnet is repelling the at least one permanent magnet or when the at least one permanent magnet abuts the at least one electromagnet;
at least one permanent magnet fixed to the piston and within an electromagnetic field of the at least one electromagnet;
a fluid contained within the chamber;
a hydraulic compensator in fluid communication with the piston chamber and the plunger chamber; and
a hydraulic line connecting the piston chamber, the plunger chamber, and the hydraulic compensator,
wherein in the first position the middle section is contained mostly within the proximal chamber, and the fluid is contained within the distal chamber and the hydraulic line; and
reversing a current to the at least one electromagnet to change a polarity of the at least one electromagnet, wherein changing the polarity induces the piston to move to a second position wherein the middle section is contained mostly within the distal chamber, and the fluid is mostly contained within the plunger chamber, the hydraulic compensator, and the hydraulic line.

24. The method of claim 14, wherein the piston further comprises a first piston and a second piston, further comprising combining a power output of the first piston with a second piston, wherein each of the piston are connected to a crankshaft.

25. The method of claim 24, further comprising moving the first piston reciprocally relative to the second piston, wherein the first piston is in the first position while the second piston is in the second position.

* * * * *